No. 867,702.
PATENTED OCT. 8, 1907.
A. F. CLARKE.
DISCHARGE VALVE FOR GAS COMPRESSORS.
APPLICATION FILED AUG. 13, 1906.
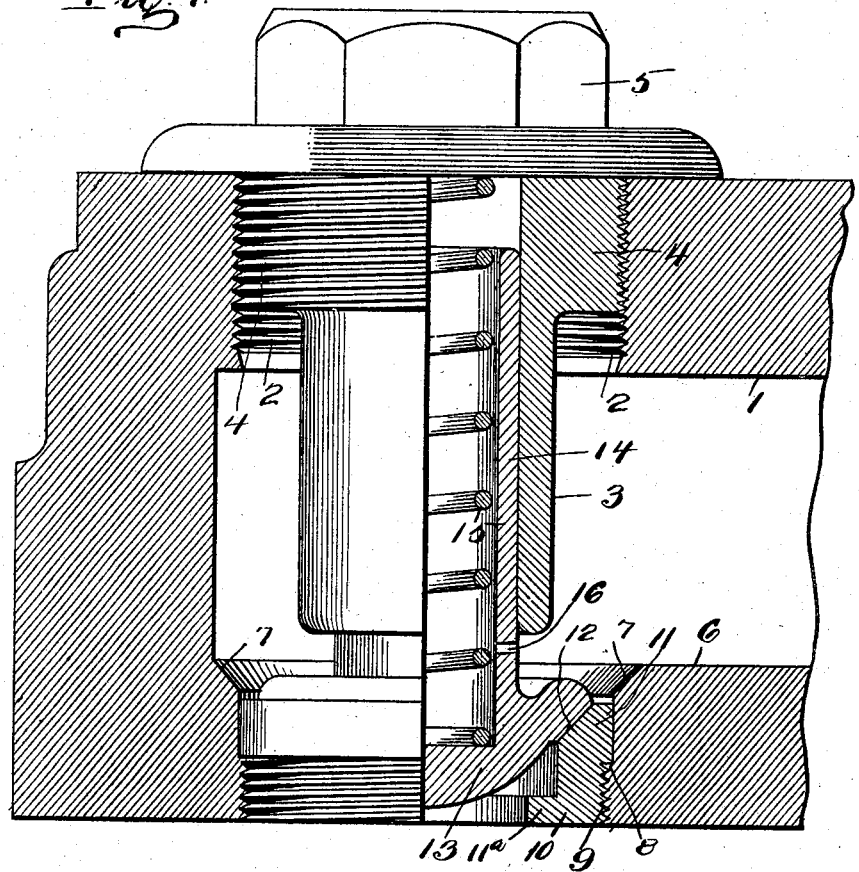
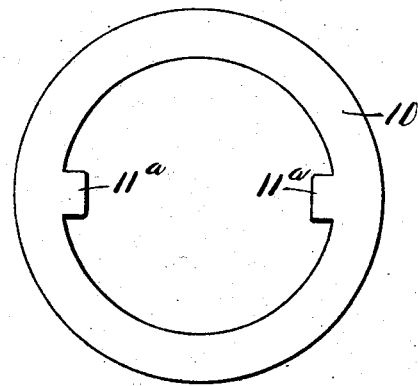

UNITED STATES PATENT OFFICE.

ARTHUR F. CLARKE, OF BUTLER, PENNSYLVANIA.

DISCHARGE-VALVE FOR GAS-COMPRESSORS.

No. 867,702.                 Specification of Letters Patent.         Patented Oct. 8, 1907.

Application filed August 13, 1906. Serial No. 330,360.

*To all whom it may concern:*

Be it known that I, ARTHUR F. CLARKE, a citizen of the United States of America, residing at Butler, in the county of Butler and State of Pennsylvania, have invented certain new and useful Improvements in Discharge-Valves for Gas-Compressors, of which the following is a specification, reference being had therein to the accompanying drawing.

This invention relates to discharge valves for gas or air compressors, and its object is to provide valves of this character with removable seats. Ordinarily in this class of machines, the discharge valve seat is formed by counter-boring the discharge opening of the cylinder, the valve resting within such counter-bore. This manner of seating the valve is objectionable for the reason that the constant striking thereon of the valve, soon unduly wears the seat, necessitating expensive repairs thereto.

The present invention aims to avoid this objection, by providing the discharge opening of the cylinder with a removable steel bushing, which when worn may be readily removed and replaced by a new bushing.

The construction of the improvement will be more specifically described hereinafter in connection with the accompanying drawing which forms a part of this specification and its novel features will be defined in the appended claims.

In the drawing, Figure 1 is a view partly in side elevation, and partly in vertical section, of a discharge valve equipped with my improved detachable valve-seat, and Fig. 2 is a bottom plan view of the valve seat removed from the cylinder wall.

The reference numeral 1 designates a portion of the outer wall of a gas compressor cylinder formed with a threaded opening 2 to receive a tubular guide 3 provided with a threaded collar 4 fitting the opening 2, and having a squared head 5.

The numeral 6 designates the inner wall of the compressor cylinder formed with a discharge opening 7 the wall of which is bored to form an annular shoulder 8 and screw threaded below said shoulder as at 9.

The removable valve seat which constitutes the distinguishing feature of the invention, consists of a steel ring or bushing 10 externally threaded to engage the threads of the discharge opening, and formed with an annular flange 11 adapted to rest upon the shoulder 8, and diametrically opposite lugs 11$^a$.

The upper edge 12 of the removable seat 10 is beveled to adapt it to closely fit a correspondingly beveled discharge valve 13, the stem 14 of which is hollow and fits within the tubular guide 3. A coil spring 15 is disposed within this hollow stem, one end of said spring bearing against the valve 13 and the opposite end against the head 5 of the tubular guide.

The guide 3 is preferably provided with a small opening 16 to admit a sufficient quantity of air to the interior of the guide to cushion the movement of the valve in its descent, and to permit the air compressed by the upward movement of the valve to escape.

The utility of the improvement will be readily understood. The removable steel bushing may be quickly removed and renewed when worn, and thus the delay and expense of repairing valve seats when worn, are entirely avoided.

What I claim and desire to secure by Letters Patent, is:—

The combination with a compressor cylinder having a discharge opening, and a hardened-steel bushing threaded into engagement with the walls of said opening and beveled at its upper end to form a valve seat, a tubular guide mounted in the wall of said cylinder, having a closed upper end, a hollow valve-stem mounted to work in said tubular guide and having an air inlet port, a valve carried by said valve-stem to engage the valve-seat, and a spring in the valve-stem resting at its lower end on the valve and at its upper end engaging the closed upper end of the guide.

In testimony whereof I affix my signature in the presence of two witnesses.

ARTHUR F. CLARKE.

Witnesses:
F. O. McCLEARY,
SAMUEL PAYNE.